D. M. MYERS.
FORCE AIR PUMP.
APPLICATION FILED APR. 11, 1917.

1,265,240.

Patented May 7, 1918.

WITNESSES
Arthur K. Moore
J. B. Middleton

INVENTOR
Daniel M. Myers

BY Richard Owen.

ATTORNEY

UNITED STATES PATENT OFFICE.

DANIEL M. MYERS, OF JEFFERSON, IOWA, ASSIGNOR OF ONE-HALF TO ALVIN W. PHILLIPS, OF JEFFERSON, IOWA.

FORCE AIR-PUMP.

1,265,240.

Specification of Letters Patent.

Patented May 7, 1918.

Application filed April 11, 1917. Serial No. 161,267.

*To all whom it may concern:*

Be it known that I, DANIEL M. MYERS, a citizen of the United States, residing at Jefferson, in the county of Greene and State of Iowa, have invented certain new and useful Improvements in Force Air-Pumps, of which the following is a specification.

This invention relates to new and useful improvements in air pumps and the principal object of the invention is to make the valves of the pump operate by positive means.

Another object of the invention is to actuate the valves by means of the piston rod by connecting said valves to the rod.

Another object of the invention is to provide simple and efficient means for permitting the air to flow past the piston rod when the valves are opened.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described and specifically pointed out in the appended claims.

In describing my invention in detail, reference will be had to the accompanying drawings, wherein like characters denote like or corresponding parts throughout the several views, and in which.

Figure 1:
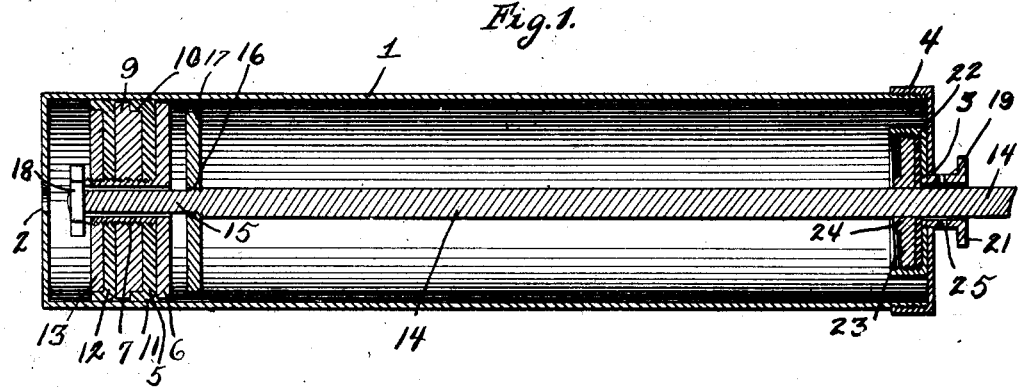
Figure 1 is a longitudinal, sectional view showing the piston at the beginning of its rearward stroke.
Figure 2:
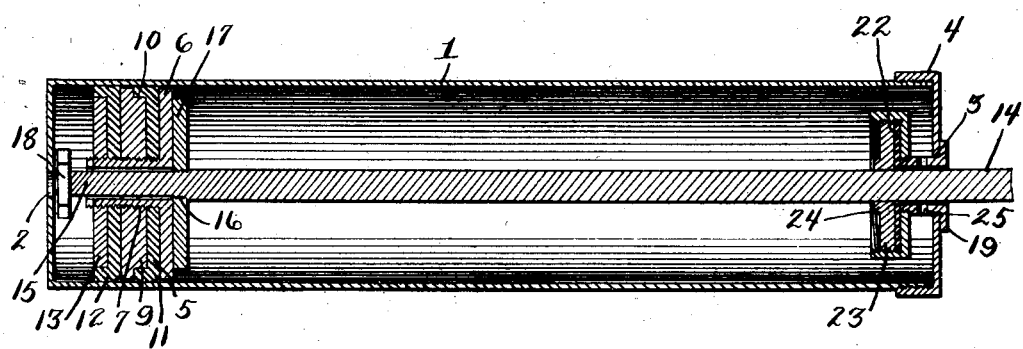
Fig. 2 is a like view, showing the piston at the end of its forward stroke.
Figure 3:
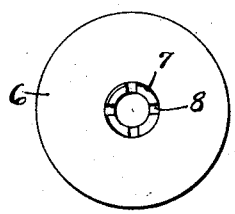
Fig. 3 is an end view of the sleeve and plate of the piston.
Figure 4:
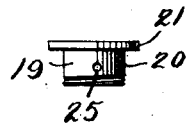
Fig. 4 is a view of the inlet wave.

In these figures, 1 indicates the cylinder of the pump having the outlet 2 leading to an air tank or the like and an inlet 3 at its other end and this end of the cylinder is covered by a screw threaded cap 4. 5 indicates the piston composed of the plate 6 having a screw threaded sleeve 7 thereon and at the end said sleeve is provided with slots 8. 9 is a metal washer having an annular recess 10 therein to receive the turned down end of the leather washer 11 located between the washer 9 and the plate 6. 12 is another leather washer held in place by the plate 13, all of said plates and washers having screw threaded engagement with the sleeve 7 and said sleeve projects beyond the plate 13 so that the slots 8 therein will be free and uncovered. 14 is the piston rod having a reduced end 15 and a screw threaded part 16 to receive a valve-plate 17 located above the piston. The reduced end 15 of the piston rod passes through the sleeve 7 and is of smaller diameter than said sleeve, so as to leave a space between itself and the sleeve and at its extreme end said rod carries a plate 18 adapted to contact with the extreme end of the sleeve on the upward movement of the piston.

At the upper end of the piston a valve 19 is arranged to move in the hole 3 in the top 4, said valve consisting of a sleeve 20 of greater diameter than the piston rod and surrounding the same and a flange 21. At its inner end said sleeve is provided with screw threads for engaging with a packing box 22, said box being closed by a plate 23 fitting in said box and having screw threaded engagement therewith. This plate is provided with a wrench-engaging part 24. Said plate forces the packing in the box tightly against the piston rod so that the box and valve are moved with the piston until stopped by the cover 4. The sleeve 20 is provided with holes 25, through which the air passes to the interior of the cylinder when the valve is opened.

On the inward stroke of the piston the valve plate 17 closes the air port in the piston and the valve 19 opens so that the suction created by the movement of the piston draws in air around the piston rod through the ports 25 into the cylinder and on the outward stroke of the piston, the valve 17 is opened and the valve 19 closed. Thus the air in the cylinder flows out through the port in the piston and this operation is repeated on each stroke of the piston.

It is thought from the foregoing that the advantages and novel features of my invention will be readily apparent.

I desire it to be understood that I may make slight changes in the construction and in the combination and arrangement of the several parts, provided that such changes fall within the scope of the appended claims.

I claim as my invention:

1. An air pump, comprising a cylinder having an inlet and an outlet at opposite ends, a rod operable within the cylinder through the inlet thereof, a valved piston at the inner end of the rod, a sleeve on the rod and having a limited play in the inlet of the cylinder and having its outer portion spaced from the rod and laterally apertured, a valve at the inner end of the sleeve, and means for securing a close fit between the inner end of the sleeve and the rod.

2. An air pump comprising a cylinder having inlet and outlet ports, a piston rod, a piston on the rod having an air port, a valve plate on the piston rod for controlling the port in the piston, a sleeve fitting in the inlet port and being of larger diameter than the rod and surrounding the same, said sleeve having openings therein and a packing box secured to the sleeve within the cylinder and surrounding the piston rod so that the said sleeve has limited movement with the piston rod.

In testimony whereof I affix my signature in presence of two witnesses.

DANIEL M. MYERS.

Witnesses:
EDMUND B. WILSON,
SAMUEL J. SAYERS.

Copies of this patent may be obtained for five cents each, by addressing the "Commissioner of Patents, Washington, D. C."